Feb. 20, 1968      W. S. GALLAWAY ET AL      3,369,447

GAIN CONTROL FOR SPECTROPHOTOMETERS

Filed June 10, 1964

INVENTORS
WILLIAM S. GALLAWAY
FRANKLYN L. WASKA

BY *Paul R. Harder*
ATTORNEY

United States Patent Office 3,369,447
Patented Feb. 20, 1968

3,369,447
GAIN CONTROL FOR SPECTROPHOTOMETERS
William S. Gallaway, Fullerton, and Franklyn L. Waska, La Habra, Calif., assignors to Beckman Instruments, Inc., a corporation of California
Filed June 10, 1964, Ser. No. 374,056
7 Claims. (Cl. 88—14)

This invention relates generally to radiation comparison systems and more particularly to an apparatus for compensating the output of a radiation sensing device which varies as a function of wavelength in the absence of absorption of a sample.

As is well known, the intensity of the radiation emitted from most radiation sources varies as a function of wavelength. Further, various optical elements, such as, for example, prisms, mirrors and various lenses, also transmit or reflect differing amounts of the incident radiation depending upon the wavelength of the incident radiation. The sensitivity of most radiation detectors is likewise a function of the wavelength of the incident radiation.

In many systems, particularly single beam spectrophotometers, it is desirable to provide a system in which the radiation detector produces a constant or substantially constant output signal as a function of wavelength in the absence of absorption by a sample. By providing such a system the 100% line of the single beam spectrophotometer may be maintained constant. This may be most readily accomplished by varying the output impedance or gain of the radiation detector as a function of wavelength.

It is, therefore, a principal object of this invention to provide an apparatus for maintaining the output of a radiation detector substantially independent of variations in background radiation and the sensitivity of the detector due to changes in wavelength.

Another object is to provide an apparatus for compensating the output of a radiation sensing device so that the output thereof is independent of variations in background radiation and sensitivity of the detector that is inexpensive, simple of construction and accurate, and wherein the compensation may be readily varied from time to time without extensive modification to correct the compensation as the background radiation and the sensitivity of the detector changes over a period of time due to aging of the various components and other parameters.

To accomplish the foregoing objects, the present invention generally contemplates the utilization of a nonlinear impedance as the load impedance of a radiation sensing device and controlling the impedance thereof as a function of wavelength. The nonlinear impedance may conveniently be a radiation sensitive impedance positioned to receive radiation from a source. A linear potentiometer is connected to the monochromator wavelength drive and driven at a 1-to-1 ratio. The potentiometer is connected in series with the radiation source and a source of potential. The linear potentiometer may be provided with taps across which vernier potentiometers are connected to provide a nonlinear variable impedance in series with the radiation source.

Other objects and many attendant advantages of the present invention will become more readily apparent to those skilled in the art and the same may be better understood by reference to the following detailed description when considered in connection with the accompanying drawing wherein.

Figure 1:
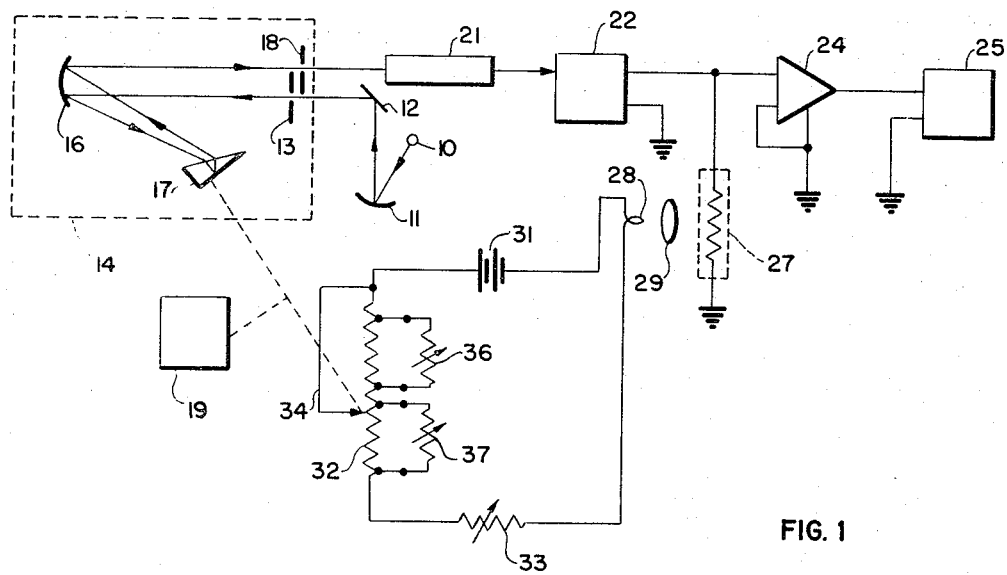
FIG. 1 illustrates a single beam spectrophotometer embodying the teachings of this invention.

Referring now to FIG. 1, radiation from source 10 is focused by condenser mirror 11 and flat mirror 12 upon the entrance slit 13 of monochromator 14. Radiation passing the entrance slit is reflected by collimating mirror 15 to a dispersing element 17 such, for example, as a quartz prism and the dispersed radiation returned to exit slit 18 by collimating mirror 16. The wavelength of the radiation passed from the monochromator through exit slit 18 may be varied by changing the position of the dispersing element through any suitable wavelength drive 19. It should be understood that entrance and exit slits 13 and 18 are normally disposed in the same plane and may be positioned one above the other rather than horizontally displaced as illustrated in the drawing.

The dispersed radiation passes a cell 21 and is focused on radiation sensing device 22 which produces an electrical signal output that is a function of the radiation incident upon the detector. The radiation sensing device may comprise any suitable radiation detector such, for example, as a photomultiplier tube or a red sensitive photo tube. The output of radiation sensing device 22 is amplified by amplifier 24 and its output applied to any suitable indicating means 25 such, for example, as a recorder.

Figure 2:
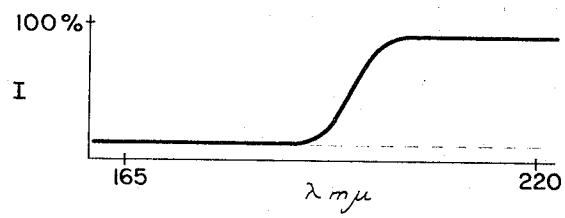
FIG. 2 illustrates the output of a typical radiation sensing device as a function of wavelength in the absence of sample absorption.

With the system thus described, which is typical of the prior art systems, the output of the detector which is a function of the incident radiation and the sensitivity of the detector when utilizing a hydrogen lamp as source 10 and scanning over the region from approximately 165 to 220 m$\mu$ is illustrated by the curve of FIG. 2. In order to obtain a meaningful record over the entire region it is obvious that the gain of the system must be such that the maximum output of the detector will be recorded at or near full scale of the recorder. When this is done the output of the detector at the shorter wavelengths is so small that absorption bands in this region are not detected.

Figure 3:
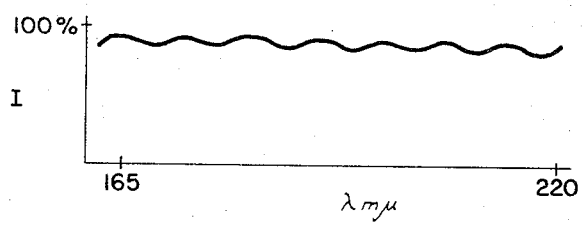
FIG. 3 illustrates the compensated output of a typical radiation sensing device as a function of wavelength in the absence of sample absorption when utilizing the teachings of this invention.

It is, therefore, desirable to provide a system wherein the detector output is not a function of wavelength in the absence of an absorption by the sample. By constructing a system which maintains the output of the detector substantially constant over the entire region as indicated by the dashed line of FIG. 2, the gain of amplifier 24 may be increased so as to bring this level of radiation intensity at or near full scale of the recorder as illustrated in FIG. 3 even though much of the energy of source 10 in the region of 220 m$\mu$ is lost. However, by this method absorption bands over the entire region may be detected and recorded.

To accomplish this a variable impedance 27 is connected as the load impedance of the radiation sensing device 22 and its impedance controlled as a function of wavelength. The variable impedance 27 may conveniently comprise a photoresistor whose resistance is a function of radiant energy impinging thereon and may be positioned to receive radiation from source 28. If desired, a lens 29 may be interposed between source 28 and impedance 27.

Connected in electrical circuit with source 28 are electrical source 31 and variable impedances 32 and 33. Variable impedance 32 may conveniently be a potentiometer having its slider 34 connected to wavelength drive 19. Impedance 32 may be a nonlinear potentiometer manufactured to generate the desired function necessary to maintain the output of radiation sensing device 22 independent of wavelength in the absence of sample absorption. Such potentiometers are, however, difficult and expensive to manufacture and once produced provide no means for changing the generated function to compensate for changes in the detector output which occur over a period of time due to aging of the various components of the system.

Impedance 32 may more advantageously be a linear potentiometer having a series of taps across which vernier potentiometers may be connected which are utilized to shape the impedance function of the impedance 32. Two vernier potentiometers 36 and 37 are illustrated, but it should be understood that the number of vernier potentiometers and the manner of connection will be dictated only by the desired function to be generated by impedance 32.

Figure 4:
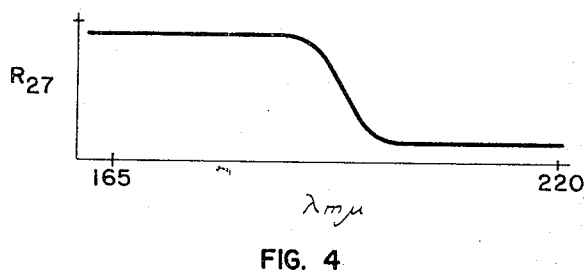
FIG. 4 illustrates the impedance characteristic of the radiation sensing device load impedance as a function of wavelength that produces the output of FIG. 3.

FIG. 4 illustrates the desired series resistance versus wavelength curve for variable impedance 27 when the output of radiation sensing device 22 has the function illustrated in FIG. 2. The vernier potentiometers across variable impedance 32 allow the shaping of the impedance curve of impedance 27 and variable potentiometer 33 permits shifting of the curve of FIG. 4 to the right or left. The nonlinearity of the light flux versus heating current for lamp 28 and the nonlinearity of the light flux versus impedance curve of photoresistor 27 allow a great deal of freedom in shaping the resistance curve of the photoresistor and allow a nonlinear change in impedance over the range of several decades.

As an alternative to the embodiment illustrated the intensity of the radiation impinging upon photoresistor 27 may be varied by an appropriately shaped aperture driven in synchronism with the radiation dispersing element. The impinging radiation on the photoresistor could thus be programmed in any desired manner.

This alternative, however, has the disadvantage that once the aperture is fabricated, it generally cannot be modified to compensate for changes in the characteristics of the various components that occur with age. The complex aperture shapes required to provide the necessary program are also, in some instances, difficult to fabricate with the accuracy desired.

While the invention has been described in connection with the illustrated preferred embodiment, it should be understood that other embodiments will be apparent to those skilled in the art and that many modifications and variations may be made without departing from the spirit of the invention and the scope of the appended claims.

What is claimed is:

1. In a spectrophotometer having a wavelength drive means and a radiation sensing means wherein the electrical output signal varies as a function of wavelength, the improvement comprising:
   a radiation source;
   a photosensitive impedance means connected to said radiation sensing means for controlling the output thereof and positioned to receive radiation from said source; and
   means for controlling the intensity of the radiation impinging upon said photosensitive impedance means as a function of the wavelength of the radiation impinging upon said radiation sensing means, such that variations in the output of said radiation sensing means as a function of wavelengths in the absence of absorption by a sample are substantially compensated.

2. A compensation circuit for use with a spectrophotometer having a wavelength drive means and a radiation sensing means wherein the electrical output signal of said radiation sensing means varies as a function of wavelength in the absence of absorption by a sample, the improvement comprising:
   a radiation source;
   photosensitive means connected to said radiation sensing means for controlling the output thereof and positioned to receive radiation from said radiation source;
   an electrical energy source and a variable impedance connected in electrical circuit with said radiation source; and
   means varying the impedance of said variable impedance means as a function of wavelength impinging upon said radiation sensing means whereby the output of said radiation sensing means may be controlled as a function of wavelength such that variations in the output of said radiation sensing means as a function of wavelength in the absence of absorption by a sample are substantially compensated.

3. In a spectrophotometer of the type having a wavelength drive means and a radiation sensing means producing an electrical output signal that varies as a function of wavelength in the absence of absorption by a sample and means connected to said radiation sensing means to provide an electrical signal proportional to the radiation incident upon said radiation sensing means, the improvement comprising:
   a photosensitive impedance means connected to control the gain of said radiation sensing means as a function of variations in impedance of said photosensitive impedance means;
   a radiation source positioned to impinge radiant energy on said photosensitive impedance means; and
   means energizing said radiation source, said means including means connected to said wavelength drive means and driven thereby for controlling the radiant energy emitted by said radiation source such that variations in the output of said radiation sensing means as a function of wavelength in the absence of absorption by a sample are substantially compensated.

4. In a spectrophotometer of the type having a wavelength drive means and a radiation sensing means wherein the electrical output signal varies as a function of wavelength in the absence of absorption by a sample, the improvement comprising:
   a radiation source;
   a photosensitive impedance means connected to said radiation sensing means for controlling the output thereof and positiond to receive radiation from said radiation source;
   an electrical energy source and a variable impedance means connected in electrical circuit with said radiation source;
   said variable impedance means including at least one impedance connected across at least a portion thereof to shape the impedance characteristic of said variable impedance means; and
   said variable impedance means connected to said wavelength drive means to vary the energy emitted by said radiation source as a function of wavelength whereby the output of said radiation sensing means may be controlled as a function of wavelength.

5. In a spectrophotometer of the type having a wavelength drive means and a radiation sensing means wherein the electrical output signal varies as a function of wavelength in the absence of absorption by a sample, the improvement comprising:
   a radiation source;
   a photosensitive impedance means connected to said radiation sensing means and positioned to receive radiation from said source; and
   an electrical energy source and first and second variable impedance means connected in electrical circuit with said radiation source, one of said variable impedance means connected to said wavelength drive means for varying the energy emitted by said radiation source as a function of wavelength whereby the output of said radiation sensing means may be controlled as a function of wavelength.

6. In a spectrophotometer of the type having a wavelength drive means and a photomultiplier for sensing variations in incident radiation, the improvement comprising:
- a radiation source;
- a photosensitive impedance means connected to form at least a portion of the load impedance of said photomultiplier and positioned to receive radiation from said source whereby the gain of said photomultiplier is a function of the impedanc of said photosensitive impedance means;
- an electrical energy source and variable impedance means connected in electrical circuit with said radiation source; and
- means connected to said wavelength drive and said variable impedance means for varying the impedance thereof as a function of wavelength.

7. In a spectrophotometer of the type having a wavelength drive means and a photomultiplier for sensing variations in incident radiation, the improvement comprising:
- a photosensitive impedance means connected to form at least a portion of the load impedance of said photomultiplier whereby the gain of said photomultiplier is a function of the impedance of said photosensitive means;
- a radiation source positioned to focus radiation on said photosensitive means;
- a source of electrical energy;
- a variable impedance means including a linear potentiometer having a plurality of taps;
- at least one vernier potentiometer connected across said taps for shaping the impedance characteristics of said potentiometer;
- means connected to said wavelength drive means and said potentiometer for varying the impedance thereof as a function of wavelength; and
- means connecting said radiation source, said source of electrical energy and said variable impedance means in electrical circuit for varying the intensity of said radiation source as a function of wavelength.

No references cited.

JEWELL H. PEDERSEN, *Primary Examiner.*

B. J. LACOMIS, *Assistant Examiner.*